United States Patent
Finch et al.

(10) Patent No.: US 10,899,666 B2
(45) Date of Patent: Jan. 26, 2021

(54) HIGH SOLIDS POLYCARBOXYLATE SYNTHESIS FOR CEMENT SUPERPLASTICIZERS

(71) Applicant: Rohm and Haas Company, Collegeville, PA (US)

(72) Inventors: William C. Finch, Ambler, PA (US); Mike McGinnis, Collegeville, PA (US); Sudhir M. Mulik, North Wales, PA (US); Charles J. Rand, Philadelphia, PA (US)

(73) Assignee: Rohm and Haas Company, Collegeville, PA (US)

( * ) Notice: Subject to any disclaimer, the term of this patent is extended or adjusted under 35 U.S.C. 154(b) by 2 days.

(21) Appl. No.: 15/773,593

(22) PCT Filed: Nov. 18, 2016

(86) PCT No.: PCT/US2016/062657
§ 371 (c)(1),
(2) Date: May 4, 2018

(87) PCT Pub. No.: WO2017/095657
PCT Pub. Date: Jun. 8, 2017

(65) Prior Publication Data
US 2019/0152851 A1 May 23, 2019

Related U.S. Application Data

(60) Provisional application No. 62/260,795, filed on Nov. 30, 2015.

(51) Int. Cl.
| | | |
|---|---|---|
| C04B 24/24 | (2006.01) | |
| C04B 24/26 | (2006.01) | |
| C08F 120/06 | (2006.01) | |
| C08F 2/38 | (2006.01) | |
| C08F 2/02 | (2006.01) | |
| C08G 81/02 | (2006.01) | |
| C04B 103/32 | (2006.01) | |

(52) U.S. Cl.
CPC ........ C04B 24/246 (2013.01); C04B 24/2647 (2013.01); C04B 24/2658 (2013.01); C08F 2/02 (2013.01); C08F 2/38 (2013.01); C08F 120/06 (2013.01); C08G 81/02 (2013.01); C04B 2103/32 (2013.01)

(58) Field of Classification Search
CPC .............. C04B 24/246; C04B 24/2647; C04B 24/2658; C04B 2103/32; C08F 2/02; C08F 2/38; C08F 120/06; C08G 81/02
USPC ........................................................ 106/810
See application file for complete search history.

(56) References Cited

U.S. PATENT DOCUMENTS

| | | | |
|---|---|---|---|
| 5,294,686 A | * | 3/1994 | Fiarman et al. |
| 5,985,989 A | * | 11/1999 | Shawl et al. |
| 7,766,975 B2 | | 8/2010 | Clamen et al. |
| 7,906,591 B2 | | 3/2011 | Weinstein et al. |
| 8,466,244 B2 | | 6/2013 | Hampel et al. |
| 9,499,642 B2 | | 11/2016 | Rand et al. |
| 2008/0119602 A1 | | 5/2008 | Sulser et al. |
| 2013/0217808 A1 | | 8/2013 | Sulser et al. |
| 2016/0369210 A1 | | 12/2016 | Fuchs et al. |

FOREIGN PATENT DOCUMENTS

| | | |
|---|---|---|
| JP | 6287208 A | 10/1994 |
| JP | 2002510276 A | 4/2002 |
| JP | 2005520900 A | 7/2005 |
| JP | 1994287208 A | 6/2009 |
| JP | 2011500954 A | 1/2011 |

* cited by examiner

Primary Examiner — Ling Siu Choi
Assistant Examiner — Ronald Grinsted

(57) ABSTRACT

The present invention provides efficient methods to form a high solids content polymeric polyacid or a comb polymer useful as a superplasticizer or dispersant which comprise heating to from 80 to 100 C. for a first time period, and then, sequentially, heating to a second temperature of from 150 to 250° C. for a second time period a wet reaction mixture having a solids content of from 80 to 99 wt. % and comprising from 15 to 60 wt. % of one or more ethylenically unsaturated acid or a salt thereof, from 37 to 76.99 wt. % of one or more polyether polyols, alkyl polyether polyols, polyether amines or alkyl polyether amines in the presence of (i) from 0.01 to 1 wt. %, of one or more water soluble radical initiators or redox pairs and (ii) from 2 to 22 wt. % of one or more phosphorus oxide containing compounds, all weights based on the total weight of the wet reaction mixture.

10 Claims, No Drawings

HIGH SOLIDS POLYCARBOXYLATE SYNTHESIS FOR CEMENT SUPERPLASTICIZERS

The present invention relates to high solids methods for making polycarboxylate ether (PCE) or polycarboxamide ether comb polymers, such as alkyl capped poly(ethylene glycol) esters of poly(methacrylic acid), which are useful as superplasticizers for concrete.

Superplasticizers can be made via addition copolymerization of acid functional monomers, such as (meth)acrylic acids, and polyether or oligoether esters or amides of addition mononomers, such as polyethylene glycol mono(meth) acrylate. Superplasticizers can also be made via alkyl or methyl capped polyglycol, e.g. Carbowax™ (The Dow Chemical Co., Midland, Mich.), esterification or aminopolyglycol amidation of currently available polycarboxylate solution polymers, such as polymethacrylic acids (pMAA).

Known esterification or amidation methods comprise removing water from a reaction mixture of an acid functional polymer (polyacid) and a polyether by solvent assisted distillation, vacuum removal or inert gas sparging prior while reacting the polyacid. Generally, the first step comprises distilling water from a polycarboxylate/polyglycol mixture. Such a process is time consuming and requires expensive equipment, such as a vacuum reactor or a distillation tower specially equipped for that reaction.

U.S. Pat. No. 5,985,989 to Shawl et al. discloses one pot synthesis of PCEs, wherein an acid monomer is polymerized to form a polycarboxylate and a polyether is grafted thereto. In Shawl, the polyether may comprise mono or difunctional polyethers, with some difunctional polyether present to increase the probability of successful esterification or amidation. In addition, Shawl discloses the use of strong acid catalysts added after the acid polymerization and having a pKa less than 0 at levels 0.1 to 1 wt. %, based on the total weight of the polyether. The strong acids promote partial cleavage of a monoether chain resulting in from 1 to 25 wt. % of the polyether undergoing cleavage in the process. Alternatively, Shawl discloses adding difunctional polyethers or a combination of monofunctional to difunctional polyethers in a weight ratio of maintained in the range 3:1 to 25:1. Difunctional polyethers promote crosslinking and are undesirable. Further, Shawl fails to provide a PCE synthesis process lacking a difunctional polyether or a strong acid catalyst which provides rapid esterification.

The present inventors have sought to solve the problem of providing a more efficient way to make polycarboxylate ether comb polymers, such as those used as superplasticizers, rheology modifiers and colloidal stabilizers without the need for strong acid catalysts or for extensive distillation of water to make them.

STATEMENT OF THE INVENTION

1. In accordance with the present invention, methods of making polycarboxylate or polycarboxamide ether comb polymers comprise heating to a temperature of from 80 to 100° C., or, preferably from 95 to 99° C. for a first time period of 5 to 300 minutes, or, preferably, from 30 to 240 minutes, or, more preferably, from 60 to 180 minutes, and, sequentially, then heating, preferably, under a partial vacuum of from 10 to 300 or from 10 to 100 mm/Hg, to a second temperature of from 150 to 250° C., preferably, from 160 to 200° C. for a second time period of from 30 to 600 minutes, or, preferably, from 60 to 300 minutes, or, preferably, less than 240 minutes, a reaction mixture in water (wet reaction mixture) having a solids content of from 80 to 99 wt. %, or, preferably, from 90 to 99 wt. %, or, more preferably, 95 wt. % or more of the reaction mixture comprising from 15 to 60 wt. %, or, preferably, 20 wt. % or more, or, preferably, from 30 to 55 wt. %, or, more preferably, from 32 to 55 wt. %, based on the total weight of the wet reaction mixture, of one or more ethylenically unsaturated acid or a salt thereof, preferably, methacrylic acid, a salt thereof, a mixture of methacrylic acid with acrylic acid, or salts thereof, from 37 to 76.99 wt. % or, preferably, from 42 to 64.99 wt. %, based on the total weight of the wet reaction mixture of one or more polyether polyols, alkyl polyether polyols, polyether amines or alkyl polyether amines, in the presence of (i) from 0.01 to 1 wt. %, or from 0.05 to 0.5 wt. %, based on the total weight of the wet reaction mixture, of one or more water soluble radical initiators or redox pairs and in the presence of (ii) from 2 to 22 wt. %, or, preferably, from 6 to 15 wt. %, based on the total weight of the wet reaction mixture, of one or more phosphorus oxide containing compounds chosen from a hypophosphite, such as sodium hypophosphite, or an organic phosphite to form a comb polymer.

2. In accordance with the methods of the present invention in item 1, above, wherein the total amount of the of one or more polyether polyols, alkyl polyether polyols, polyether amines or alkyl polyether amines that is a diol or difunctional amine is 3 wt. % or less, or, preferably, 2 wt. % or less, or, more preferably, 1 wt. % or less, based on the total weight of the one or more polyether polyols, alkyl polyether polyols, polyether amines or alkyl polyether amines.

3. In accordance with the methods of the present invention in any of items 1 or 2, above, wherein the weight average molecular weight of the one or more polyether polyols, alkyl polyether polyols, polyether amines or alkyl polyether amines ranges from 200 to 5000, or, preferably, 500 to 3000, or, more preferably, from 600 to 2500.

4. In accordance with the methods of the present invention in any of items 1, 2, or 3, above, wherein the methods further comprise, prior to heating, charging to a vessel or wet reaction mixture all of the one or more polyether polyol, alkyl polyether polyol, polyether amine or alkyl polyether amine and all of the one or more phosphorus oxide containing compounds, with at least some of water, followed by feeding the one or more ethylenically unsaturated acid or salt, the one or more radical initiators or one or more redox pair to form a wet reaction mixture and reacting the wet reaction mixture at a temperature for the first time period to form a polymeric polyacid, and then heating the resulting polymeric polyacid containing reaction mixture (final wet reaction mixture) for the second time period at the second temperature.

5. In accordance with the methods of the present invention as in any of items 1, 2, 3, or 4, above, wherein ratio of moles of carboxyl or carboxylate groups of ethylenically unsaturated acid to moles of amine or hydroxyl groups in the total wet reaction mixture ranges from 9:1 to 1:1, or, preferably, from 6:1 to 2.6:1.

6. In accordance with the methods of the present invention in any of items 1, 2, 3, 4, or 5, above, wherein the adding of the one or more phosphorus oxide containing compounds to a vessel or wet reaction mixture comprises charging all of the total phosphorus oxide containing compound into the wet reaction mixture or vessel prior to heating.

7. In accordance with the methods of the present invention as in any of items 1, 2, 3, 4, 5, or 6, above, wherein the resulting comb polymer has a weight average molecular weight of from 6,000 to 160,000 or, preferably, from 20,000 to 60,000, or, more preferably, up to 60,000.

8. In accordance with the methods of the present invention as in any of items 1, 2, 3, 4, 5, 6, or 7, above, wherein the wet reaction mixture or vessel containing it is free of added organic solvent.

9. In accordance with the methods of the present invention as in any previous item, wherein the heating to a second temperature takes place after a delay of from 30 minutes to 60 days, or, preferably, 5 to 45 days.

As used herein, the term "acidic polymerized units" refers to carboxylic anhydrides, carboxylic acids and salts thereof. Carboxylic anhydrides of methacrylic acid can form from the acidic functions of neighboring acidic polymerized units along a single telomer chain, from acidic functions of distal acidic polymerized units along a single telomer chain, or from acidic functions of separate telomer chains.

As used herein the term phosphorus oxide refers to any oxide of phosphorus in the +3 or +1 oxidation state.

As used herein, the term "average particle size" refers to a mean average particle size determined by Laser Diffraction Particle Size Analysis.

As used herein, the term "based on the total weight of monomers" refers to the total weight of addition monomers, such as, for example, methacrylic acids and vinyl monomers.

As used herein, the term "total weight of reactants" of a wet reaction mixture is the total solids weight of ethylenically unsaturated acid, polyether polyol, alkyl polyether polyol, polyether amine or alkyl polyether amine, and phosphorus oxide containing compound used to make the polymer.

As used herein, unless otherwise indicated, the term "molecular weight" or "Mw" for polyacid polymers refers to a weight average molecular weight as determined by gel permeation chromatography (GPC) as against polyacrylic acid standards; for comb polymers, it refers to a weight average molecular weight calculated from size exclusion chromatography (SEC).

As used herein, the term "wt. %" stands for weight percent.

All ranges recited are inclusive and combinable. For example, a disclosed temperature of 80 to 100° C., preferably, 95 to 99° C., would include a temperature of from 80 to 100° C., from 80 to 95° C., from 80 to 99° C., from 95 to 100° C. or, preferably, from 95 to 99° C.

Unless otherwise indicated, all temperature and pressure units are room temperature (~20-22° C.) and standard pressure (STP), also referred to as "ambient conditions".

All phrases comprising parenthesis denote either or both of the included parenthetical matter and its absence. For example, the phrase "(co)polymer" includes, in the alternative, polymer, copolymer and mixtures thereof.

The present inventors have found a more efficient way to make polycarboxylate ether (PCE) and polycarboxamide ether copolymers in a single vessel, without distillation equipment, and without any strong protic acid catalyst or added organic solvent. In accordance with the present invention, the reaction mixture forms a polymer bound catalyst from the phosphorus oxide containing compound to minimize cleavage of polyglycols or polyethers, thereby preserving their original character. In the methods of the present invention, any catalyst can be added at or before the start of any reaction. The heating during the first time period produces a polymeric polyacid in a high solids medium; and the heating to the second temperature makes the comb polymer.

Where the heating to a second temperature is delayed, the present invention enables one to ship or store a polymeric polyacid for later processing to make a PCE or polycarboxamide.

The polycarboxylate or polycarboxamide ether of the present invention comprises a polyacid polymer having on the polymer backbone a graft density of from 11 to 39% of acid groups esterified or amidated or, preferably, from 13 to 35 wt. %.

Polymerization of the ethylenically unsaturated acids or salts in the wet reaction mixture of the present invention can be initiated by various methods known in the art, such as, preferably, by using the thermal decomposition of one or more initiators, for example, by using an oxidation-reduction reaction ("redox reaction") to generate free radicals to effect the polymerization. Methods, media and reagents for such polymerization can be those used to make a polymeric polyacid as disclosed in U.S. Pat. No. 7,766,975, to Clamen et al.

Molecular weight of the product polycarboxylate or polycarboxamide ether of the present invention is also controlled by the one or more phosphorus oxide containing compounds which act as a chain transfer agent (CTA).

Preferably, to control the molecular weight of the polymeric polyacid backbone of the polycarboxylate or polycarboxamide ether, addition of the polyether polyol, alkyl polyether polyol, polyether amine or alkyl polyether amine is staged to occur after at least some polymerization of the ethylenically unsaturated acid monomer in the presence of one or more water soluble radical initiators or redox pairs known in the art, such as sodium persulfate.

Preferably, the backbone of the polycarboxylate or polycarboxamide ether comb polymer is formed by gradual addition solution polymerization in water as disclosed in U.S. Pat. No. 7,766,975, to Clamen et al.

When forming a comb polymer in accordance with the present invention, the reaction is run in oxygen free or oxygen starved conditions, preferably, in an inert atmosphere or, more preferably, in an inert atmosphere (nitrogen and/or argon) in the presence of a phosphorus oxide containing compound such as phosphorous+1, for example, sodium hypophosphite, and an initiator.

Preferably, the methods in accordance with the present invention reaction take place in a continuous reactor, such as, for example, an extruder, a continuous stirred tank reactor, or in an exchange column or by solid phase combinatorial synthesis.

Suitable ethylenically unsaturated carboxylic acids or anhydrides useful in the wet reaction mixture of the present invention include, for example, methacrylic acid, acrylic acid, crotonic acid, fumaric acid, maleic acid, 2-methyl maleic acid, itaconic acid, citraconic acid, mesaconic acid, cyclohexenedicarboxylic acid, 2-methyl itaconic acid, α-methylene glutaric acid, monoalkyl maleates, and monoalkyl fumarates, and salts thereof; ethylenically unsaturated anhydrides, such as, for example, maleic anhydride, itaconic anhydride, acrylic anhydride, and methacrylic anhydride, and salts thereof. Any anhydride group containing ethylenically unsaturated acid monomers will form acids in the wet reaction mixture.

Preferably, the ethylenically unsaturated acids include (meth)acrylic acid and maleic acid, and salts thereof.

The ethylenically unsaturated acid monomers of the present invention can comprise from 1 to 100 wt. % of methacrylic acids or salts thereof, based on the total weight of ethylenically unsaturated acid or salt monomers in the wet reaction mixture.

The methods of the present invention may be performed using a wet reaction mixture comprising up to 20 wt. %, or, preferably, from 0 to 10 wt. %, or, more preferably, 0 to 1 wt. % of non-acid group containing monomers, such as vinyl monomers like $C_1$ to $C_{18}$ alkyl (meth)acrylates and styrene, based on the total weight of the monomers used in the wet reaction mixture.

Suitable polyether polyols, alkyl polyether polyols, polyether amines or alkyl polyether amines for use in the wet reaction mixture of the present invention can have from 1 to 113, preferably, 90 or less or 6 or more, or, preferably, from 10 to 66 oxyalkylene groups. The alkoxy group of the side chain may have from 2 to 4 carbon atoms.

The suitable alkyl polyether polyols, polyether amines or alkyl polyether amines useful for forming comb polymers can be one or more compounds of formula I, II, III or IV

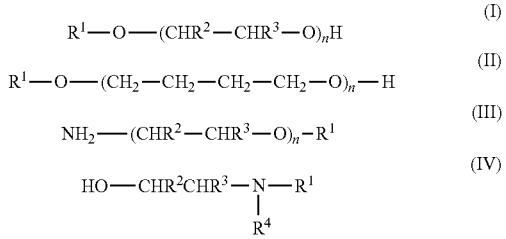

wherein $R^1$ is selected from $C_1$-$C_{50}$ alkyl; $R^2$ and $R^3$ are independently selected from H, methyl or ethyl; and $R^4$ is independently selected from $C_1$-$C_{50}$ alkyl, hydroxyethyl, acetoxyethyl, hydroxy-isopropyl, or acetoxy-isopropyl; and n is an integer from 1 to 113.

Examples of compounds of formula (I) are alkylpolyalkylene glycols which include but are not limited to methylpolyethylene glycol having a molecular weight of 350; methylpolyethylene glycol having a molecular weight of 500; methylpolyethylene glycol having a molecular weight of 750; methylpolyethylene glycol having a molecular weight of 1000; methylpolyethylene glycol having a molecular weight of 1500; methylpolyethylene glycol having a molecular weight of 2000; methylpolyethylene glycol having a molecular weight of from 500 to 5,000; and butylpolyethylene glycol having a molecular weight of from 1,000 to 5,000.

The alkyl polyether polyols of the formulae I and II and the alkyl polyether amines of formulae III and IV can be used together with ammonia or amines in the preparation of comb polymers.

Suitable amines are, for example, alkylamines having molar masses of up to 2000, dialkylamines having molar masses of up to 1,000, for example, ethylamine, butylamine, hexylamine, octylamine; fatty amines, such as, for example, stearylamine, tallow fatty amine and palmitylamine; unsaturated fatty amines, e.g. oleylamine; alkoxyalkylamines, such as 2-methoxyethylamine, methoxypropylamines; alkoxylated alkylamines or alkoxylated dialkylamines; and amino alcohols, such as ethanolamine, and diethanolamines, such as N,N dimethyl ethanolamine, or N,N diethyl ethanolamine.

Examples of compounds that give alkoxy(poly)oxyalkylene side chains are available from The Dow Chemical Company (Midland, Mich.) under the CARBOWAX™ brand name, and from Clariant as M-Type and B11/D21 Polyglycols (Clariant Corp., Charlotte, N.C.).

In accordance with the present invention, the wet reaction mixture comprise from 2 to 22 wt. %, based on the total weight of the wet reaction mixture, or, preferably, 6 wt. % or more, or, preferably, 15 wt. % or less of a phosphorus oxide containing compound chosen from a hypophosphite or phosphite containing compound. Such a phosphorus oxide containing compound can comprise $C_1$ to $C_4$ dialkyl or trialkyl or phenyl phosphites or diphenyl phosphite; orthophosphorous acid or salts thereof or a hypophosphite compound or its salt, such as, for example, sodium hypophosphite.

The comb polymer product compositions of the present invention may comprise suspensions thereof in non-aqueous carriers, such as oils, e.g. vegetable oils, glycols, polyglycols, ethers, glycol ethers, glycol esters and alcohols, preferably having a solids content of 40 to 60 wt. % or more, or, more preferably, 45 to 55 wt. %.

The product polycarboxylate or polycarboxamide ether composition of the present invention can further be dried, for example, by spray drying or extrusion.

The product polycarboxylate or polycarboxamide ethers of the present invention have on average at least one phosphorus atom that is bound to a carbon atom in the polymeric polyacid backbone, which can be determined by $P^{31}$ NMR, as appropriate, as a terminal or within the polymer chain. The at least one phosphorus in the polymer backbone can be bound to two carbon atoms, as a phosphinate, e.g. a dialkyl phosphinate. Examples of structures of such polymers is as described in U.S. Pat. No. 5,294,686 to Fiarman et al.

Many uses in a wide variety of applications exist for the comb polymers prepared from the methods of the present invention. Such comb polymers find use as superplasticizers, especially where the alkoxy group of the side chain has from 1 to 4 carbon atoms. Such comb polymers are particularly useful as builder in detergent compositions, especially liquid detergent compositions. In addition, such comb polymers can be used as polymeric dispersants such as pigment dispersants for various coatings applications, suspending agents for suspending particulate materials in fluid media, and the like. In addition, the comb polymers find use as polymeric binders for a variety of coatings applications, such as for architectural coatings, marine coatings, paper coatings, can coatings, binders and coatings for textile and non-woven material, roll coatings, and the like. Further, the comb polymers find use as tanning agents for leather manufacture and as rheology modifiers and thickeners, especially where the alkoxy group of the side chain is hydrophobic, having from 8 to 20 carbon atoms.

The following examples illustrate the present invention. Unless otherwise indicated, all parts and percentages are by weight and all temperatures are in degrees centigrade (° C.).

The following experimental test methods were used:

Size Exclusion Chromatography (SEC):

Separations were carried out on a liquid chromatograph consisting of an Agilent 1100 Model isocratic pump, autosampler, degasser (Agilent Technologies, Santa Clara, Calif.) and a Waters 410 Model differential refractometer (Waters Corp., Milford, Mass.) operated at ambient temperature. System control, data acquisition, and data processing were performed using version 3.1 of Cirrus® software (Polymer Laboratories, part of Agilent, Church Stretton, UK). SEC separations were performed using: a) two analytical Plaquagel-OH™ 30A columns (300×7.5 mm ID (inner diameter) plus a guard column (50×7.5 mm ID) (Agilent Technologies, Santa Clara, Calif.) in 20 mM $NaH_2PO_4$ at pH=7 b) three Shodex Asahipak™ GF-310HQ+

GF-510HQ+GF-710HQ columns (300×7.8 mm ID) (Showa Denko KK, Kawasaki, Japan) in 100 mM NH4Ac in MeOH. Unless otherwise indicated, 100 μL of sample solutions were injected into a column set for SEC separations.

SYNTHESIS OF EXAMPLE 1: PMAA POLYMER WITH 9 WT. % CHAIN TRANSFER AGENT (CTA) HALF CHARGED AND HALF FED, MADE IN MPEG 2,000

To a 5 L reaction kettle under a nitrogen sweep was charged all of the phosphorus oxide containing compound as indicated in Table 1, below, and the indicated methylpolyethylene glycol having a molecular weight of 2,000 (mPEG 2000) which was allowed to melt while heating to 97° C., when melted stirring was started and then the indicated phosphorus oxide containing compound, sodium hypophosphite (NaHP) was charged. Then, the indicated initiator, sodium persulfate (NaPS) and methacrylic acid (MAA) monomer was fed to the kettle over 120 minutes, feeding the monomer on the surface of kettle contents. At the same time, in parallel, the indicated phosphorus oxide containing compound (NaHP) was fed over a period of 95 minutes. The reaction temp. was maintained at 97° C. during the feeds. At end of feeds, the temperature was held @ 97° C. for 20 more minutes.

TABLE 1

Synthesis of pMAA at 94 wt. % Solids

| Material | Conc. | Solids Wt. (g) | Tot. Wt. (g) |
|---|---|---|---|
| mPEG 2,000 | 100.0% | 1247.4 | 1247.4 |
| CTA | | | |
| NaHP (aqueous) | 45.0% | 37.42 | 83.2 |
| DI Rinse H$_2$O | 0.0% | 0.0 | 5.0 |
| Monomer Feed | | | |
| MAA | 100.0% | 831.6 | 831.6 |
| DI Rinse H$_2$O | 0.0% | 0.0 | 5 |
| CTA Cofeed | | | |
| SHP (aqueous) | 45.0% | 37.42 | 83.2 |
| DI Rinse H$_2$O | 0.0% | 0 | 2.5 |
| Initiator Cofeed | | | |
| NaPS (aqueous) | 45.0% | 24.9 | 55.43 |
| DI Rinse H$_2$O | 0.0% | 0.0 | 5.0 |
| Wt. % Solids | 94.0% | 2178.8 | 2318 |

SYNTHESIS OF EXAMPLE 2: PMAA POLYMER WITH CHAIN TRANSFER AGENT (CTA) HALF CHARGED AND HALF FED MADE IN MPEG 2,000

To a 5 L reaction kettle under a nitrogen sweep was charged half the phosphorus oxide containing compound as indicated in Table 2, below, and the indicated methylpolyethylene glycol having a molecular weight of 2,000 (mPEG 2000) which was allowed to melt while heating to 97° C., when melted stirring was started. Then, the indicated initiator and methacrylic acid (MAA) monomer was fed to the kettle over 120 minutes, feeding the monomer on the surface of kettle contents. At the same time, in parallel, the indicated phosphorus oxide containing compound (NaHP) was fed over a period of 105 minutes. The reaction temp. was maintained at 97° C. during the feeds. At end of all feeds, the temperature was held @ 97° C. for 20 more minutes.

TABLE 2

Synthesis of PMAA at 96.1 wt. % Solids

| Charge | Conc. | Sols. Wt. | Tot. Wt. |
|---|---|---|---|
| mPEG 2,000 | 100.0% | 1247.4 | 1247.4 |
| CTA | | | |
| NaHP | 45.0% | 18.72 | 41.6 |
| DI Rinse H$_2$O | 0.0% | 0.0 | 2.5 |
| Monomer Feed | | | |
| MAA | 100.0% | 415.8 | 415.8 |
| DI Rinse H$_2$O | 0.0% | 0.0 | 2.5 |
| CTA Cofeed | | | |
| NaHP | 45.0% | 18.72 | 41.6 |
| DI H$_2$O | | | |
| DI Rinse H$_2$O | 0.0% | 0.0 | 1.2 |
| Initiator Cofeed | | | |
| NaPS | 100.0% | 12.5 | 12.47 |
| DI H$_2$O | | 0.0 | 15.24 |
| DI Rinse H$_2$O | 0.0% | 0.0 | 2.5 |
| Dilution Water | | | |
| DI H$_2$O | 0.0% | 0.0 | |
| Wt. % Solids = | 96.1% | 1713.1 | 1783 |

SYNTHESIS OF EXAMPLE 3 PCE: PMAA POLYMER WITH 9% CHAIN TRANSFER AGENT (CTA) MADE IN MPEG 2,000

To a 5 L reaction kettle under a nitrogen sweep was charged the methylpolyethylene glycol having a molecular weight of 2,000 (mPEG 2000) as indicated in Table 3, below, and all of the indicated phosphorus oxide containing compound. The mPEG was allowed to melt while heating to 97° C., when melted stirring was started. Then, the indicated initiator and methacrylic acid (MAA) monomer was fed to the kettle over 120 minutes, feeding the monomer on the surface of kettle contents. At the same time, in parallel, the indicated initiator was fed over a period of 120 minutes. The reaction temp. was maintained at 97° C. during the feeds. After 1.5 hours of polymerization, 15 grams of DI water was charged and an additional 10 grams of DI water was charged at 1.75 hours, this is listed as dilution water in Table 3, below. After polymerization of the polyacid, 1435 additional grams of mPEG 2,000 was added and the mixture was heated to 180° C. for 3 hours under 20 inHg of vacuum.

TABLE 3

Synthesis of PMAA at 91.6 wt. % Solids

| Charge | Conc. | Sols. Wt. | Tot. Wt. |
|---|---|---|---|
| mPEG 2,000 | 100.0% | 499.0 | 499.0 |
| CTA | | | |
| NaHP | 45.0% | 29.97 | 66.6 |
| DI Rinse H$_2$O | 0.0% | 0 | 2 |
| Monomer Feed | | | |
| MAA | 100.0% | 332.6 | 332.6 |
| DI Rinse H$_2$O | 0.0% | 0 | 2 |

TABLE 3-continued

Synthesis of PMAA at 91.6 wt. % Solids

| Charge | Conc. | Sols. Wt. | Tot. Wt. |
|---|---|---|---|
| Initiator Cofeed | | | |
| NaPS | 45.0% | 10.0 | 22.17 |
| DI Rinse H₂O | 0.0% | 0 | 2 |
| Dilution Water | | | |
| DI H₂O | 0.0% | 0 | 25 |
| Wt. % Solids = | 91.6% | 871.5 | 951 |

SYNTHESIS EXAMPLE 4 PCE: PMAA POLYMER WITH 9% CHAIN TRANSFER AGENT (CTA) MADE IN MPEG 2,000

To a 5 L reaction kettle under a nitrogen sweep was charged the indicated methylpolyethylene glycol having a molecular weight of 2,000 (mPEG 2000), polypropylene glycol 2000, and all of the phosphorus oxide containing compound (NaHP) indicated in Table 4, below. The mPEG was allowed to melt while heating to 97° C., when melted stirring was started. Then, the indicated initiator and methacrylic acid (MAA) monomer was fed to the kettle over 120 minutes, feeding the monomer on the surface of kettle contents. At the same time, in parallel, the indicated intiator was fed over a period of 120 minutes. The reaction temp. was maintained at 97° C. during the feeds. After polymerization of the polyacid, the mixture was heated to 180° C. for 2.75 hours under 20 inHg of vacuum. The reaction was stopped due to excessive crosslinking as noted by a significant increase in viscosity.

TABLE 4

Synthesis of PMAA at 95.7 wt. % Solids

| Charge | Conc. | Sols. Wt. | Total Weight |
|---|---|---|---|
| PPG 2,000 | 100.0% | 72.6 | 72.6 |
| mPEG 2,000 | 100.0% | 1469.9 | 1469.9 |
| CTA | | | |
| NaHP | 45.0% | 61.1 | 61.1 |
| DI Rinse H₂O | 0.0% | 0 | 5 |
| Monomer Feed | | | |
| MAA | 100.0% | 305.7 | 305.7 |
| DI Rinse H₂O | 0.0% | 0 | 0 |
| Initiator Cofeed | | | |
| NaPS | 45.0% | 9.2 | 20.3 |
| DI Rinse H₂O | 0.0% | 0 | 0 |
| Dilution Water | | | |
| DI Rinse H₂O | 0.0% | | 35.1 |
| Total | | 1884.9 | 1969.8 |

From the synthesis Examples 1, 2, 3, and 4, the GPC Weight average molecular weight data for polymeric polyacids that result from heating for the first time period is as follows:

TABLE 5

Weight Average Molecular Weights of pMAA (Before Esterification)

| Example | Description | Mw |
|---|---|---|
| 1 | 42% pMAA synthesized in mPEG 2000, 50/50 NaHP precharge/cofeed | 10,197 |
| 2 | 24% pMAA synthesized in mPEG 2000, 50/50 NaHP precharge/cofeed | 26,613 |
| 3 | 42% pMAA synthesized in mPEG 2000, 100% NaHP precharge | 6,969 |
| 4 | 15.5% pMAA synthesized in mPEG 2,000 and PPG 2,000, 100% NaHP precharge | 16,675 |

From Table 5, above, it is apparent that in all Examples, a polymeric polyacid results from the methods wherein the wet reaction mixture is heated for the first time period. Thus, in accordance with the present invention, one can form a polymeric polyacid with very little water and, thereby, enable economical formation of comb polymers or PCEs at the second temperature. Example 1 shows the advantage of increasing the content of the ethylenically unsaturated acid relative to the content of the polyether containing compound, giving a lower, more controlled molecular weight. Example 3 shows the advantage of charging all of the phosphorus oxide containing compound with the polyether containing compound prior to feeding ethylenically unsaturated acid and heating for the first period, thereby giving a lower molecular weight polymeric polyacid in comparison to inventive Example 1.

Applications Testing:

The comb polymers (PCE) made from the methods in Examples 3 and 4 were tested in concrete. All PCEs were formulated in a 3:1 mixture of sand to cement (50-30 Unimin™ sand (Unimin Corp., New Canaan, Conn.) and Type I Grey Portland Cement) at a constant water level of 42 wt. % on cement with Deefo™ PI-35 Defoamer (Munzing, Bloomfield, N.J.) at 1.0 wt. % on PCE solids. Immediately after mixing, the wet mortar samples were placed and packed in brass flow molds (10 cm diameter base) on the plate of a motorized flow table. After tamping, the molds were removed from the wet mortar and the de-molded samples were subjected to 25 table drops. After the dropping process was completed, the samples were measured with the mortar diameter check calipers for flow differences and recorded. Acceptable results are diameters at least 10% greater than the control. The testing was performed using guidelines of test method ASTM-1437-13 (2013), Flow of Hydraulic Cement Mortar.

Table 6, below, shows the results of the methods of the present invention compared to no added PCE and to other known methods where cleavage of a polyether to make it difunctional is required. Table 6 shows that a comparative Example 4 made with a diol (PEG) or cleaved alkyl polyether rather than with an alkylpolyether mono-ol provided no slump or cement flow compared to the control without any PCE. Meanwhile, the inventive Example 3 polymer made with an alkylpolyether mono-ol successfully performed as a PCE and improved the flow of the cement.

TABLE 6

| Slump Test Results | |
| --- | --- |
| Example | Diameter |
| *No PCE | 10.3 |
| 3 | 12.4 |
| *4 | 10.4 |

*indicates Control.

We claim:

1. A method for making a polycarboxylate or polycarboxamide ether comprising:

heating to a temperature of from 80 to 100° C. for a first time period of 5 to 300 minutes, and then, sequentially, heating to a second temperature of from 150 to 250° C. for a second time period of from 30 to 600 minutes a wet reaction mixture in water having a solids content of from 80 to 99 wt. % of the wet reaction mixture comprising from 15 to 60 wt. %, based on the total weight of the wet reaction mixture, of one or more ethylenically unsaturated acid or a salt thereof, from 37 to 76.99 wt. %, based on the total weight of the wet reaction mixture of one or more polyether polyols, alkyl polyether polyols, polyether amines or alkyl polyether amines, in the presence of (i) from 0.01 to 1 wt. % , based on the total weight of the wet reaction mixture, of one or more water soluble radical initiators or redox pairs and in the presence of (ii) from 2 to 22 wt. %, based on the total weight of the wet reaction mixture, of one or more phosphorus oxide containing compounds chosen from a hypophosphite or an organic phosphite to form a comb polymer.

2. The method as claimed in claim 1, wherein the solids content of the wet reaction mixture ranges from 90 to 99 wt. %.

3. The method as claimed in claim 1, wherein the heating during the second time period takes place under a partial vacuum of from 10 to 300 mm/Hg.

4. The method as claimed in claim 1, wherein the one or more ethylenically unsaturated acid is chosen from methacrylic acid or a salt thereof, or a mixture of methacrylic acid with acrylic acid, or salts thereof.

5. The method as claimed in claim 1, wherein the total amount of the one or more polyether polyols, alkyl polyether polyols, polyether amines or alkyl polyether amines that is a diol or difunctional amine is 3 wt. % or less, based on the total weight of the one or more polyether polyols, alkyl polyether polyols, polyether amines or alkyl polyether amines.

6. The method as claimed in claim 1, wherein the weight average molecular weight of the one or more polyether polyols, alkyl polyether polyols, polyether amines or alkyl polyether amines ranges from 200 to 5000.

7. The method as claimed in claim 1, wherein the ratio of moles of carboxyl or carboxylate groups of ethylenically unsaturated acid to moles of amine or hydroxyl groups in the total wet reaction mixture ranges from 9:1 to 1:1.

8. The method as claimed in claim 1, wherein the comb polymer has a weight average molecular weight of from 6,000 to 160,000.

9. The method as claimed in claim 1, wherein the wet reaction mixture is free of added organic solvent.

10. The method as claimed in claim 1, comprising charging all of the total phosphorus oxide containing compound into the wet reaction mixture or vessel prior to heating.

* * * * *